(12) United States Patent
Geerlings et al.

(10) Patent No.: US 9,873,167 B1
(45) Date of Patent: Jan. 23, 2018

(54) LASER-INDUCED CHANNELS IN MULTI-LAYER MATERIALS

(71) Applicant: Gentex Corporation, Zeeland, MI (US)

(72) Inventors: Kurtis L. Geerlings, Zeeland, MI (US); Donald L. Bareman, Zeeland, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 440 days.

(21) Appl. No.: 14/580,157

(22) Filed: Dec. 22, 2014

Related U.S. Application Data

(60) Provisional application No. 61/919,699, filed on Dec. 20, 2013.

(51) Int. Cl.
  *B23K 26/00* (2014.01)
  *B23K 26/36* (2014.01)
  *B23K 26/40* (2014.01)

(52) U.S. Cl.
  CPC .......... *B23K 26/006* (2013.01); *B23K 26/009* (2013.01); *B23K 26/367* (2013.01); *B23K 26/4095* (2013.01)

(58) Field of Classification Search
  CPC ........ B23K 26/40; B23K 26/38; B23K 26/06; B23K 26/00; B23K 26/0054; B23K 26/0057; B23K 26/006; B23K 26/0063; B28D 5/00; C03B 33/09
  USPC ............ 219/121.67–121.72, 121.82, 121.85; 438/463
  See application file for complete search history.

(56) References Cited

U.S. PATENT DOCUMENTS

| | | | |
|---|---|---|---|
| 8,842,358 B2 | 9/2014 | Bareman et al. | |
| 2011/0132885 A1* | 6/2011 | Sercel | B23K 26/0608 219/121.72 |
| 2014/0038392 A1* | 2/2014 | Yonehara | H01L 21/304 438/463 |
| 2015/0151380 A1* | 6/2015 | Hosseini | B23K 26/009 428/600 |

FOREIGN PATENT DOCUMENTS

JP    2013223886    * 10/2013

* cited by examiner

*Primary Examiner* — Samuel M Heinrich
(74) *Attorney, Agent, or Firm* — Foley & Lardner LLP; Bradley D. Johnson

(57) ABSTRACT

A laser system comprising a laser that produces a pulsed laser beam is configured to form a laser-induced channel in a multi-layer substrate including first and second material layers. The material layers may have different refractive indices. The laser-induced channel includes a uniform distribution of self-focus damage volumes through at least a portion of the thickness of one or both of the material layers. One of the material layers may be partially transparent or non-transparent. An optical assembly of the laser system can be configured to produce uniformly distributed self-focus damage volumes at an effective focal region corresponding to the substrate thickness. The distribution of damage volumes can be tailored to include areas or peaks of high damage volume density where it is desired to ablate material.

10 Claims, 4 Drawing Sheets

LASER-INDUCED CHANNELS IN MULTI-LAYER MATERIALS

TECHNICAL FIELD

The present disclosure generally relates to laser-based processes and, more particularly, to structures and methods for forming laser-induced channels in a substrate.

BACKGROUND

A substrate material can be separated into two or more pieces by forming a plurality of laser induced channels along a process path located along an intended line of separation, as taught by Bareman et al. in U.S. Pat. No. 8,842,358. A laser-induced channel edge can be formed upon substrate separation and can have a relatively smooth surface without the need for post-processing operations such as grinding. The types of substrate materials through which such laser-induced channels can be formed has been somewhat limited to substrate materials with a single refractive index.

SUMMARY

According to at least one embodiment, a method of using a laser system comprising a laser that produces a pulsed laser beam includes the steps of: providing a multi-layer substrate comprising a first material layer that is at least partially transparent to the laser beam and a second material layer stacked together with the first material layer; directing the pulsed laser beam toward the multi-layer substrate such that the laser beam passes through at least a portion of both of said material layers; and forming a laser-induced channel that extends into the first material layer, the laser-induced channel comprising a uniform distribution of self-focus damage volumes.

BRIEF DESCRIPTION OF THE DRAWINGS

Illustrative embodiments of the invention will hereinafter be described in conjunction with the appended drawings, wherein like designations denote like elements, and wherein.

DETAILED DESCRIPTION OF EMBODIMENTS

Figure 1:
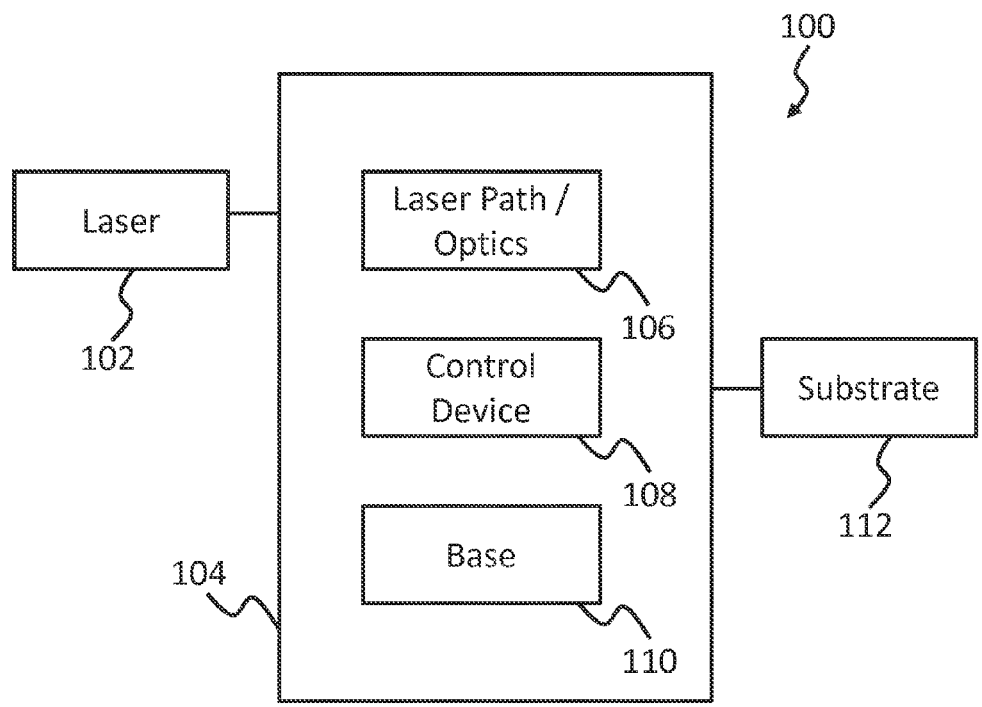
FIG. 1 is a schematic diagram of an illustrative laser system.

In reference to FIG. 1, a laser system 100 can include a laser 102 that is in optical communication with a laser delivery assembly 104. The laser delivery assembly 104 can include a laser path or optics 106, a control device 108, and a base 110. The laser delivery assembly 104 can be configured to direct a beam emitted from the laser 102 to a substrate 112, as described in greater detail herein.

Figure 2:
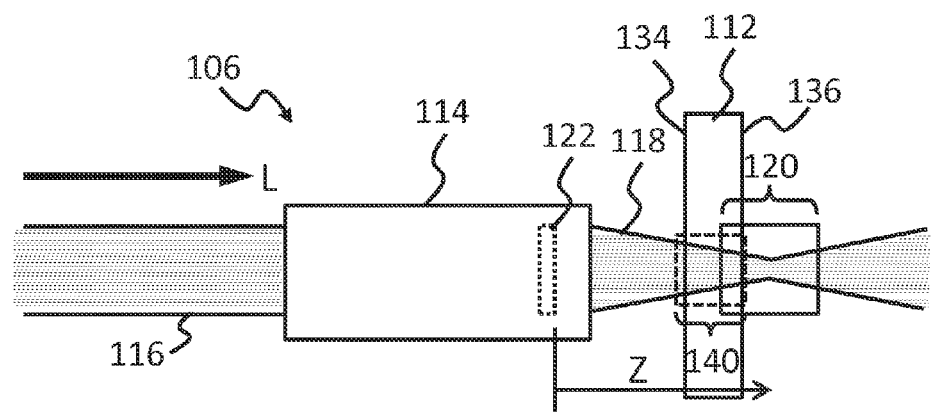
FIG. 2 illustrates an optical assembly directing a laser beam toward a focal region.

As shown in FIG. 2, the laser path 106 can include an optical assembly 114 having one or more optical elements 122 (e.g., lenses or mirrors) and can be configured to receive an incoming beam of light 116 and emit a conditioned beam 118 with a geometric focal region 120 along a direction L of light propagation. The energy in the beam 118 can be focused along the focal region 120 with a given distribution to define a focal energy distribution. The location of the geometric focal region 120 and the focal energy distribution therealong can be determined by linear ray tracing, for example, with a given beam profile being received by the optical assembly 114. The uniformity of the focal energy distribution can also be determined and, in some cases, tailored as desired by using linear ray tracing in reverse—i.e., starting with a desired focal energy distribution and determining the shape of an optical element surface that will produce the focal energy distribution with a given beam profile being received by the optical assembly 114. Determining and customizing the focal energy distribution along the geometric focal region 120 is described in further detail in U.S. patent application Ser. No. 14/539,967 by Geerlings et al., which is incorporated herein by reference.

When the substrate 112 is placed in the path of the conditioned beam 118 and is a Kerr material, non-linear self-focusing of light within the substrate may occur by action of the optical Kerr effect. Self-focusing of the light can occur due to the non-linear susceptibility of Kerr materials which creates an index of refraction that increases in direct proportion to the intensity of light. As the index of refraction increases, the light can bend closer toward focus, which can cause the index to further increase. This can result in a self-focus effect that damages a volume of the substrate material once a certain intensity threshold is reached. The self-focus effect shifts the focal region from the geometric focal region 120 to an effective focal region 140, which may span at least the extent of the substrate thickness between an entry surface 134 and an exit surface 136.

Figure 3:
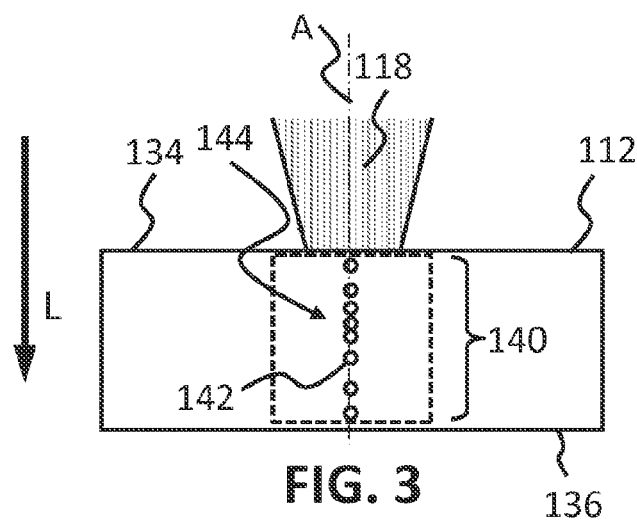
FIG. 3 illustrates a laser-induced damage channel having a plurality of self-focus damage volumes.

With reference to FIG. 3, the self-focus effect can produce a linear array of self-focus damage volumes 142 approximately along a line and about an axis A in a direction L of light propagation. The range of distances over which these damage volumes form (i.e., the effective focal region) may be closer to the optical assembly 114 (i.e., a lower value of Z) than the range of distances associated with the geometric focal region 120. The resulting plurality of self-focus damage volumes 142, such as the illustrated linear array of self-focus damage volumes 142, can form a laser-induced channel 144 within the substrate material, spanning at least a portion of the substrate thickness. The spacing among the damage volumes within a given laser-induced channel may be such that some or all of the damage volumes overlap with other damage volumes of the same laser induced channel 144. Examples of laser induced channels, methods of forming them, and products made thereby are described in U.S.

Pat. No. 8,842,358, issued on Sep. 23, 2014, which is hereby incorporated entirely herein by reference.

A plurality of spaced-apart laser-induced channels 144 can be formed in a material, such as the substrate 112, along a process path representing a desired line of separation, and the material can be separated along the laser-induced channels if sufficiently formed. According to at least one embodiment, a separation surface can be formed by a sequence of laser induced channels and optionally cracks or other damage in the substrate connecting the laser induced channels. The separation surface can be angled or perpendicular with respect to one or both opposite surfaces 134, 136 of the material.

The energy in the beam 118 can be focused along the effective focal region 140 with a given distribution to define an effective focal energy distribution. The effective focal energy distribution is realized as a distribution of self-focus damage volumes—i.e., the distribution of damage volumes along a laser-induced channel represents the effective focal energy distribution in the effective focal region 140. The location of the effective focal region 140 and the effective focal energy distribution therealong can be determined by non-linear ray tracing, for example, with a given beam profile being received by the optical assembly 114 and the self-focusing effects of the substrate being accounted for. The uniformity of the effective focal energy distribution can also be determined and, in some cases, tailored as desired by starting with a desired distribution of damage volumes in the substrate and determining the shape of an optical element surface that will result in self-focus locations distributed within the substrate thickness as desired.

Figure 4:
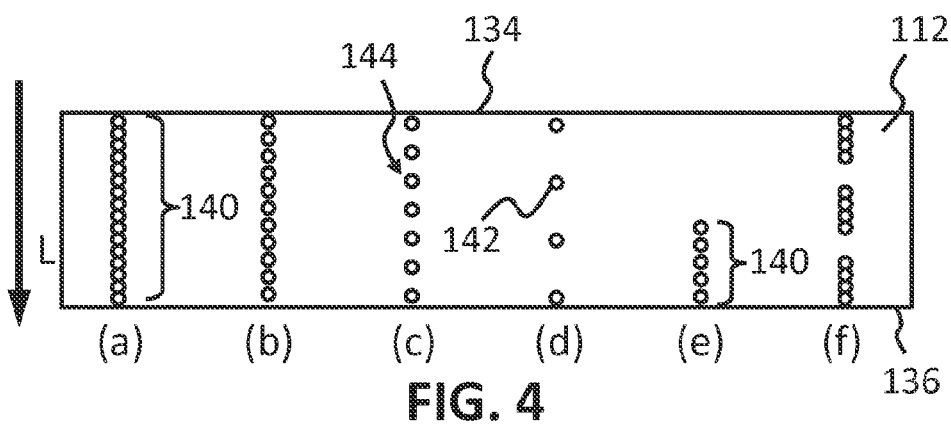
FIG. 4 illustrates various densities of self-focus damage volumes.
Figure 5:
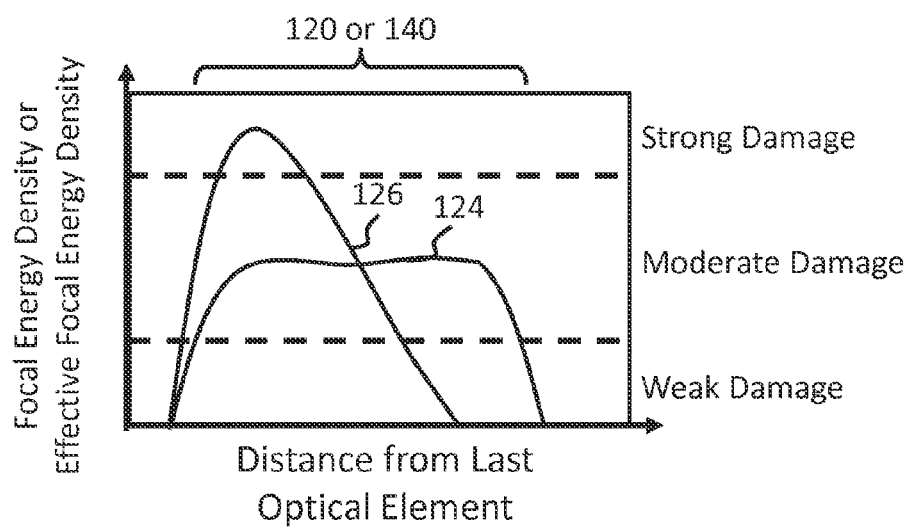
FIG. 5 is a diagram illustrating uniform and non-uniform distributions of focal energy density and effective focal energy density.

For a given substrate, it has been determined that a uniform focal energy distribution along the geometric focal region 120 and/or a uniform distribution of damage volumes 142 along the effective focal region 140 and through the substrate thickness are useful to produce a separation surface along the process path (i.e., the path along which a plurality of spaced apart laser-induced channels are formed) with a uniform appearance and along which first and second substrate portions on opposite sides of the process path can be separated with ease. FIG. 4 illustrates several examples (a)-(f) including uniformly distributed damage volumes 142 of laser-induced channels 144 formed in effective focal regions 140, with example 4(a) including a high density of damage volumes 142 along the channel 144, examples 4(b)-4(d) including successively lower densities of damage volumes, and examples 4(e) and 4(f) including uniform densities over only one or more portions representing only part of the substrate thickness. FIG. 5 illustrates examples of a uniform 124 and a non-uniform 126 focal energy distribution or effective focal energy distribution along the respective focal energy region or effective focal energy region.

As described below, laser-induced channels can be formed in a substrate with multiple material layers, which in some cases are different material compositions with different indices of refraction. In various embodiments, the laser beam can be directed along the process path and simultaneously produce laser-induced channels in first and second material layers of the substrate, or the laser beam can be directed along the process path multiple times and produce laser-induced channels in different portions of the multi-layer substrate materials each time.

Figure 6:
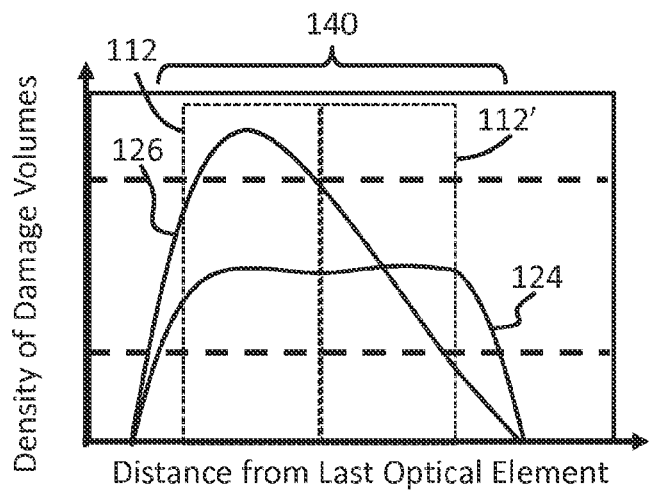
FIG. 6 is a diagram illustrating uniform and non-uniform distributions of damage volume densities with a multiple substrate layers.

In one embodiment, the laser system 100 and/or optical assembly 114 are configured to form a plurality of self-focus damage volumes 142 having a uniform distribution across the combined thickness of first and second material layers of a substrate. This is represented in FIG. 6, which is a plot of self-focus damage volume density along the effective focal region 140 as a function of distance (z) from the final optical element of the optical assembly. First and second substrate material layers 112, 112' are superimposed on the damage volume distribution curves of FIG. 6. For first and second material layers 112, 112' with the same or different first and second order indices of refraction, it may be desirable to maintain a uniform density of self-focus damage volumes, as indicated in the uniform distribution 124 of FIG. 6. As noted above, non-linear ray tracing that accounts for the non-linear self-focusing effects of each of the substrate materials 112, 112', can be used to predict and/or customize the distribution of damage volumes within the effective focal region 140. FIG. 6 additionally illustrates a non-uniform distribution 126 of damage volumes across the combined thickness of the layered materials 112, 112'. In the illustrated non-uniform distribution 126, a higher density of damage volumes is produced through the thickness of one of the material layers 112 than through the other of the material layers 112'. Moreover, the density of damage volumes is non-uniform in each of the material layers 112, 112'.

A similar effect resulting in separation surfaces with uniform appearances may be achieved by using linear ray tracing to provide a geometric focal region with a uniform focal energy distribution, which has been found to produce approximately uniformly distributed damage volumes through the substrate thickness in some cases.

In another embodiment, the first and second material layers 112, 112' are laminated together with a laminating layer 150. When the laminating layer 150 is present, the laser system may be configured in various ways, depending on the character of the laminating layer and on the desired result. In some embodiments, the desired result is separation of the multi-layer substrate into separate first and second portions on opposite sides of the process path. In such cases, if the laminating layer 150 is formed from a material that is susceptible to formation of self-focus damage volumes, then the optical assembly is configured to extend the laser-induced channel through all three material layers, with the effective focal energy density adjusted as necessary to obtain uniform damage volume distribution completely through the first and second material layers 112, 112' and the laminating layer. In the case where the laminating layer 150 does not facilitate formation of laser-induced damage volumes (e.g., it cracks erratically, heats up and melts, or does not absorb the wavelength—even at high irradiance), the laser-induced channel can is discontinuous at the laminating layer, and the laminating layer may be separated either by other means (e.g., a mechanical tool or a higher powered cutting laser), or by a very high focal energy density.

In the case of a non-transparent (i.e., at least partially absorbing or reflective) laminating layer, the same options are available. The laminating layer may be of the type that facilitates damage volume formation, and the optics can be designed accordingly. Or the material of the laminating layer is not damaged, in which case the optics can be designed to not damage the laminating layer, while forming damage volumes in the first and second material layers, taking into account the not-fully transparent nature of the laminating layer. In another example, a non-transparent layer can be damaged with a higher focal energy density, possibly timed to damage before laser-induced channel formation.

Figure 7:
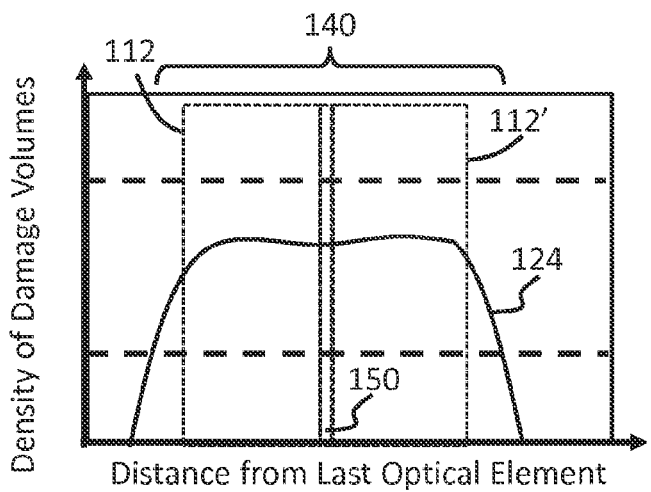
FIG. 7 is a diagram illustrating a uniform distribution of damage volume density within multiple substrate and laminating layers.

FIG. 7 illustrates an exemplary effective focal energy density distribution for the case of a transparent laminating layer 150 that facilitates formation of self-focus damage volumes. In this example, the damage volume density is tailored to remain substantially uniform across all three layers 112, 150, 112' as shown, and a laser-induced channel may be formed that is substantially uniform along its entire length, including where it passes through the transparent laminating layer.

Figure 8:
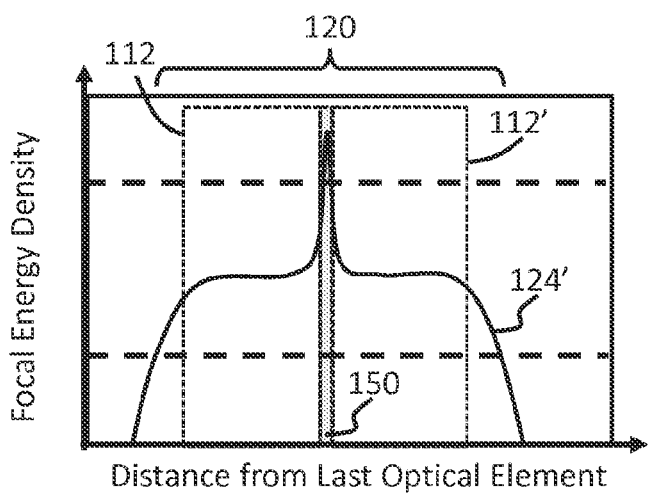
FIG. 8 is a diagram illustrating an exemplary focal energy density profile for use with a non-transparent laminating layer between substrate layers.

FIG. 8 illustrates an example in which the laminating layer 150 is non-transparent. Here, linear ray tracing is used to tailor a focal energy distribution 124' along the geometric focal region 120 with a centrally located high energy density peak that may sufficiently damage or ablate the laminating layer at the desired laser-induced channel location(s) and allow the light energy to pass through the laminating layer to produce damage volumes in the second material layer 112'. The focal energy density in this example is otherwise kept uniform on opposite sides of the peak to enable a relatively uniform distribution of damage volumes through the first and second material layers 112, 112'.

In another embodiment, a substrate material or multiple layers of substrate materials has a coating on one or both sides which may or may not be transparent to the laser wavelength. In the case of a single coating, the coating may be placed on the opposite side 136 (see FIG. 2) of the substrate material layer(s) and laser-induced damage channels may be formed through the material layer(s) with a tailored distribution of focal energy in the geometric focal region or a tailored distribution of damage volumes in the effective focal region. However, if there are two coating layers or a need for a non-transparent coating layer to be located on the impingement surface 134 (see FIG. 2), it may be desirable to tailor the focal energy distribution in the geometric focal region such that there is a much higher focal energy density at the beginning of the distribution (i.e., nearest the optical assembly) while maintaining an otherwise uniform energy density along the remainder of the geometric focal region.

Figure 9:
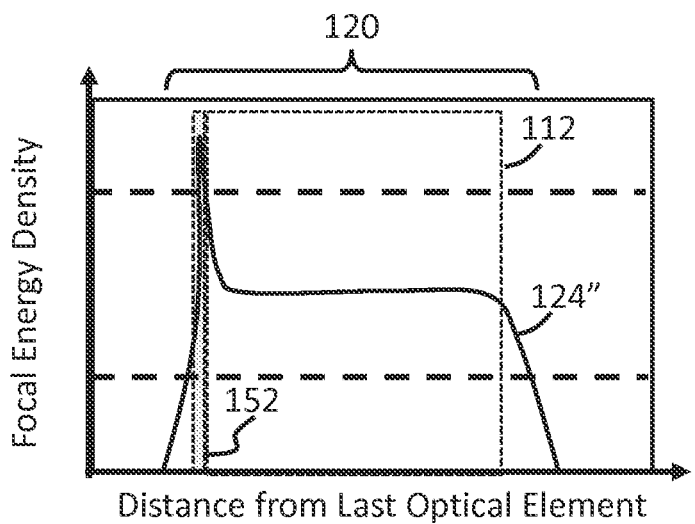
FIG. 9 is a diagram illustrating an exemplary focal energy density profile for use with a non-transparent coating layer at the impingement side of a substrate material.

This situation is illustrated in FIG. 9, which is a plot of a focal energy density distribution 124" in the geometric focal region 120, including a relatively large peak in energy density at the beginning of the focal region, corresponding in location with the coating layer 152 at the impingement side of the substrate 112. The focal energy density along the remainder of the focal region 120 is generally uniform and in the moderate damage region, as may be preferred when forming laser-induced channels along a desired line of separation. With the illustrated focal energy distribution, the non-transparent coating can be ablated by the correspondingly high portion of energy delivered at the impingement surface with laser-induced channels having a uniform distribution of damage volumes being formed through the substrate.

In another embodiment, the coating layer 152 is partially transparent and absorbs some of the laser light energy that passes through it. Where it is desired to keep the partially transparent coating layer, the distribution can be tailored with a low focal energy density corresponding to the coating layer location, and the remainder of the focal region can have a relatively uniform focal energy density that is higher than that of FIG. 9 to account for absorption losses in the partially transparent coating layer.

Similarly, some substrate materials (e.g., silicon) may be only partially transparent to the laser light, such that the further the light travels through the thickness of the substrate, the more light is absorbed. In such cases, to obtain a uniform focal energy density throughout the substrate, substrate absorption must be accounted for, by shaping the focal energy distribution in the geometric focal region to have an increasing energy density with increased distance from the final optic, for example.

In another example, a particular substrate may have variable properties or composition through its thickness. For example, chemically tempered glass may vary in both composition and in physical properties in the thickness direction, and thermally tempered glass may have varying physical properties in the thickness direction. In another example, the substrate may include one composition fused together with another composition with an interlayer having a composition gradient. The focal energy distribution or effective focal energy distribution can be tailored as necessary to create a uniform distribution of damage volumes through the thickness, or some other type of distribution of damage volumes. For instance, with tempered glass, it may be desirable to form a higher density of damage volumes in the outer compressive zones than in the internal tension zones. In such a substrate material, it may be desirable to tailor the energy distribution so that focal energy arrives in different zones in a particular order or with a particular timing.

In addition to tailoring the density of self-focus damage volumes along the effective focal region 140 or the density of focal energy along the geometric focal region, it may be desirable or necessary in certain scenarios to design the optical assembly to produce damage at some locations within the substrate layer or layers before producing damage at other locations. This may be accomplished by designing the optical path length of portions of the beam to be longer or shorter than other portions.

In an experiment, laser-induced channels were formed through the full thickness of a stack of 430 μm thick sapphire on 700 μm gorilla glass in one pass of the laser beam along a process path. In this example, referring to FIG. 10, the sapphire layer 112 was double polished to produce optically transparent entry and exit surfaces 134, 136 at its opposite sides. The sapphire layer 112 was placed loosely on top of a layer of non-strengthened gorilla glass 112' for the experiment. The gorilla glass was non-strengthened. The total thickness of the two layers 112, 112' was thus 1.13 mm. The optical assembly was configured with a lens designed (i.e., by linear ray tracing) to produce a uniform focal density in a geometric focal region.

Figure 10:
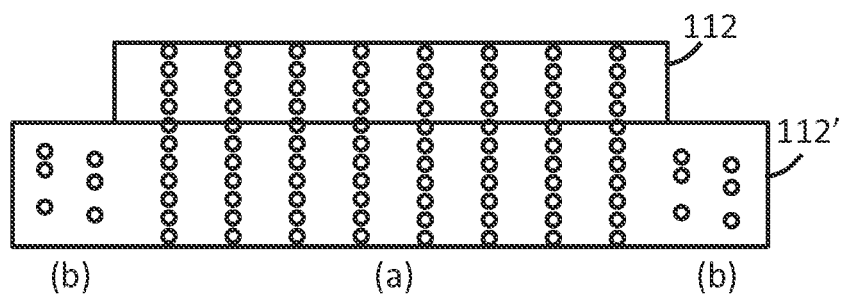
FIG. 10 is a side view of sapphire on Gorilla glass in an experimental set-up.

FIG. 10 is a schematic side view of the multi-layer substrate including first and second material layers 112, 112', with the process path having a direction (x) in the plane of the page and the laser beam impinging the sapphire layer 112. The results indicate that optics designed with a uniform focal density at the geometric focal region produced a generally uniform distribution of damage volumes through the combined thickness of the two layers 112, 112' and laser-induced channels that extend essentially through the entire thickness of both layers 112, 112'. As shown in FIG. 10, the sapphire layer 112 had a smaller length in the direction of the process path (x-direction) so that a central area (a) of the stacked layers included both layers 112, 112' and end areas (b) of the stacked layers included only the gorilla glass layer 112'. It was observed that a more uniform distribution of laser-induced damage volumes was produced in area (a), with uniformly distributed damage volumes produced through the entire thickness of both materials, than in areas (b), which had unevenly distributed damage volumes in the gorilla glass, not through the entire thickness.

This test confirms that laser-induced damage channels can be created in two separate materials with different refractive indices simultaneously and that the effect of passing through the top material layer 112 (compared with not) is evident in the density of damage volumes in the bottom material layer 112'. Thus, both material layers must be taken into account.

When determining the optics required to produce a uniform distribution of self-focus damage volumes in the effective focal region, the first and second order indices of refraction of each material may also be taken into account. Designing an optical assembly to produce an even distribution of self-focus damage volumes in sapphire may not produce an even distribution of self-focus damage volumes in a combination of sapphire and gorilla glass of the same total thickness.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of using a laser system comprising a laser that produces a pulsed laser beam, the method comprising the steps of:
   providing a multi-layer substrate comprising a first material layer that is at least partially transparent to the laser beam and a second material layer stacked together with the first material layer;
   directing the pulsed laser beam toward the multi-layer substrate such that the laser beam passes through at least a portion of both of said material layers; and
   forming a laser-induced channel that extends into the first material layer, the laser-induced channel comprising a uniform distribution of self-focus damage volumes.

2. The method of claim 1, wherein the second material layer is at least partially transparent to the laser beam and the laser-induced channel extends into both of said material layers.

3. The method of claim 2, wherein the laser-induced channel extends substantially through the thickness of both of said material layers.

4. The method of claim 1, wherein the second material layer is a coating layer that is removed by the laser beam at the location of the laser-induced channel.

5. The method of claim 1, wherein the second material layer is a coating layer, and the laser beam does not remove the coating layer.

6. The method of claim 1, wherein the multi-layer substrate comprises a laminating layer between the first and second material layers, and the laser-induced channel extends into the second material layer.

7. The method of claim 5, wherein the laminating layer is removed by the laser beam at the location of the laser-induced channel.

8. The method of claim 5, wherein the laminating layer is at least partially transparent to the laser beam and the laser beam forms a self-focus damage volume at the laminating layer so that the laser-induced channels extends into all three of said layers.

9. The method of claim 1, wherein the first material layer has an index of refraction that is different from an index of refraction of the second material layer, and the uniform distribution of damage volumes extends into both of said material layers.

10. The method of claim 9, wherein the uniform distribution of damage volumes extends through the full thickness of both of said material layers.

* * * * *